(12) United States Patent
Han et al.

(10) Patent No.: US 10,509,941 B2
(45) Date of Patent: Dec. 17, 2019

(54) OPTICAL ASSEMBLY AND FINGERPRINT IMAGING SYSTEM

(71) Applicant: Shanghai Oxi Technology Co., Ltd, Shanghai (CN)

(72) Inventors: Yong Han, Shanghai (CN); Hong Zhu, Shanghai (CN); Wei Fang, Shanghai (CN); Yan Ling, Shanghai (CN)

(73) Assignee: SHANGHAI OXI TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 15/750,393

(22) PCT Filed: Aug. 7, 2015

(86) PCT No.: PCT/CN2015/086344
§ 371 (c)(1),
(2) Date: Feb. 5, 2018

(87) PCT Pub. No.: WO2017/024438
PCT Pub. Date: Feb. 16, 2017

(65) Prior Publication Data
US 2018/0225499 A1 Aug. 9, 2018

(51) Int. Cl.
*G06K 9/00* (2006.01)
(52) U.S. Cl.
CPC .................. *G06K 9/0004* (2013.01)
(58) Field of Classification Search
CPC ................................................. G06K 9/0004
See application file for complete search history.

(56) References Cited

U.S. PATENT DOCUMENTS

| 10,154,166 | B2* | 12/2018 | Chang | G06F 3/0488 |
| 2004/0125590 | A1* | 7/2004 | Tsai | G02B 6/0038 |
| | | | | 362/625 |
| 2011/0102392 | A1* | 5/2011 | Fujioka | G02F 1/13338 |
| | | | | 345/207 |

FOREIGN PATENT DOCUMENTS

| CN | 101533471 A | 9/2009 |
| CN | 202677422 U | 1/2013 |

(Continued)

OTHER PUBLICATIONS

Third Party Submission, Hsuanyeh-Yeh Chang, Reg. No. 73,431, Jan. 22, 2019.*

(Continued)

*Primary Examiner* — Wesley J Tucker
(74) *Attorney, Agent, or Firm* — Adsero IP

(57) ABSTRACT

An optical fingerprint imaging system (200) and an optical assembly (300, 400, 500, 600, 700) are provided. The optical fingerprint imaging system (200) includes: a sensor (203, 302, 402, 502, 602, 702) and a light source (202, 301, 401, 501, 601, 701); wherein the sensor (203, 302, 402, 502, 602, 702) comprises a substrate (2031, 3021, 4021, 5021, 6021, 7021) and a photosensitive layer (2032, 3022, 4022, 5022, 6022, 7022), the substrate (2031, 3021, 4021, 5021, 6021, 7021) has a first surface and a second surface which is opposite to and lower than the first surface, and the photosensitive layer (2032, 3022, 4022, 5022, 6022, 7022) is in contact with the first surface of the substrate (2031, 3021, 4021, 5021, 6021, 7021); and wherein the light source (202, 301, 401, 501, 601, 701) is disposed at a position lower than the first surface and higher than the second surface, and light emitted from the light source (202, 301, 401, 501, 601, 701) is adapted to be guided by the substrate (2031, 3021, 4021, 5021, 6021, 7021) to the first surface of the substrate (2031, 3021, 4021, 5021, 6021, 7021). Accordingly, an optical (Continued)

fingerprint imaging system (200) with a reduced thickness, and a simplified structure is provided.

20 Claims, 4 Drawing Sheets

(56) References Cited

FOREIGN PATENT DOCUMENTS

| | | |
|---|---|---|
| CN | 204029788 U | 12/2014 |
| CN | 104598893 A | 5/2015 |
| WO | WO 00/60528 | 10/2000 |
| WO | WO 2013/102759 | 7/2013 |

OTHER PUBLICATIONS

International Search Report from PCT/CN2015/086344 dated Jun. 5, 2016.

\* cited by examiner

OPTICAL ASSEMBLY AND FINGERPRINT IMAGING SYSTEM

CROSS-REFERENCE TO RELATED APPLICATIONS

This application is the national phase of International Application No. PCT/CN2015/086344, filed on Aug. 7, 2015.

TECHNICAL FIELD

The present disclosure generally relates to optical imaging, and more particularly, to an optical assembly and a fingerprint imaging system.

BACKGROUND

An optical fingerprint imaging system can implement fingerprint image capturing based on light reflection/refraction, and light sensing. Specifically, when a finger touches an active area of the optical fingerprint imaging system, light emitted from the fingerprint imaging system will reach the finger and be reflected by the finger. As light reflected by different regions, e.g., ridges and valleys of the finger may have different intensity values, features of a fingerprint corresponding to the finger can be represented based on the light intensities. In some solutions, the reflected light may be received by a sensor where the intensity information thereof is converted into electrical signals. As such, a fingerprint image can be obtained based on processing the electrical signals.

Referring to FIG. 1, an existing optical fingerprint imaging system 100 is illustrated. The optical fingerprint imaging system 100 includes a light source 101, a light guide plate 102, and a sensor 103. The light source 101 is disposed on a lateral side of the light guide plate 102, and the light guide plate 102 is disposed below a first surface of the sensor 103. Accordingly, light emitted from the light source 101 enters into the light guide plate 102, and then is guided by the light guide plate 102 to upwardly penetrate the sensor 103. Thereafter, the light comes out from a second surface of the sensor unit 103. The second surface of the sensor 103 is located opposite to the first surface of the sensor 103, which is facing the exterior of the system.

Furthermore, the light guide plate 102, which is employed for guiding the light emitted from the light source 101 to an active surface (e.g. the second surface), generally has a thickness greater than 0.4 mm, which occupies a considerable portion of the entire thickness of the optical fingerprint imaging system.

Therefore, an optical fingerprint imaging system, which has a reduced thickness and a simplified structure, is required.

SUMMARY

According to one embodiment of the present disclosure, an optical fingerprint imaging system is provided. The optical fingerprint imaging system includes: a sensor and a light source; wherein the sensor includes a substrate and a photosensitive layer, the substrate has a first surface and a second surface which is opposite to and lower than the first surface, and the photosensitive layer is in contact with the first surface of the substrate; wherein the light source is disposed at a position lower than the first surface and higher than the second surface, and light emitted from the light source is guided by the substrate to the first surface of the substrate. In the present disclosure, higher and lower are measured with reference to an upmost surface of the optical fingerprint imaging system. When the optical fingerprint imaging system is in use, a finger is placed on the upmost surface. In the optical fingerprint imaging system, a position which is closer to the upmost surface is higher than other positions.

In some embodiments, the light source is attached to a lateral side of the substrate, or disposed in an end portion of the substrate.

In some embodiments, the optical fingerprint imaging system further includes a reflecting element for reflecting light reaching the second surface of the substrate to the first surface of the substrate.

In some embodiments, the reflecting element includes a plurality of dots formed on the second surface of the substrate.

In some embodiments, the reflecting element includes a reflecting film which is disposed facing the second surface of the substrate.

In some embodiments, the optical fingerprint imaging system further includes a shell for accommodating the sensor and the light source, and the reflecting element includes a plurality of dots formed on an inner surface of the shell, wherein the inner surface faces the second surface of the substrate.

In some embodiments, the optical fingerprint imaging system further includes a shell for accommodating the sensor and the light source, wherein an inner surface of the shell is processed to have a white or silver color, and wherein the inner surface of the shell serves as the reflecting element.

In some embodiments, the optical fingerprint imaging system further includes a flexible printed circuit which at least covers the second surface of the substrate, wherein the flexible printed circuit serves as the reflecting element.

In some embodiments, the reflecting element includes a plurality of dots formed on a light guide film, and the light guide film is disposed facing the second surface of the substrate.

In some embodiments, the light guide film is made of plastic.

In some embodiments, the substrate is made of glass.

According to one embodiment of the present disclosure, an optical assembly for an optical fingerprint imaging system is provided. The optical assembly includes: a sensor and a light source; wherein the sensor includes a substrate and a photosensitive layer, the substrate has a first surface and a second surface which is opposite to and lower than the first surface, and the photosensitive layer is in contact with the first surface of the substrate; and wherein the light source is disposed at a position lower than the first surface and higher than the second surface, and light emitted from the light source is adapted to be guided by the substrate to the first surface of the substrate.

In some embodiments, the light source is attached to a lateral side of the substrate, or disposed in an end portion of the substrate.

In some embodiments, the optical assembly according further includes a reflecting element for reflecting light reaching the second surface of the substrate to the first surface of the substrate.

In some embodiments, the reflecting element includes a plurality of dots formed on the second surface of the substrate.

In some embodiments, the reflecting element includes a reflecting film which is disposed facing the second surface of the substrate.

In some embodiments, the optical assembly further includes a flexible printed circuit which at least covers the second surface of the substrate, wherein the flexible printed circuit serves as the reflecting element.

In some embodiments, the reflecting element includes a plurality of dots formed on a light guide film, and the light guide film is disposed facing the second surface of the substrate.

In some embodiments, the light guide film is made of plastic.

In some embodiments, the substrate is made of glass.

Accordingly, in the optical fingerprint imaging system and the optical assembly provided by the present disclosure, the substrate of the sensor servers is employed both for forming a forming a photosensitive layer thereon and for guiding light to a specific surface. By such way, an additional light guide plate, which is configured in the existing optical fingerprint imaging systems, is not required. Therefore, a thickness of the optical fingerprint imaging system is reduced.

Furthermore, a reflecting element is configured so as to improve use efficiency of light. As the reflecting element is disposed on a component, such as a substrate of a sensor, an inner surface of a shell, or a flexible printed circuit, which is already existed in the optical fingerprint imaging system. In other words, the configuration of the reflecting element will not bring an additional component. Therefore, performance enhancement of the fingerprint imaging system will not bring structure complexity increment and thickness enlargement thereof.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 1:
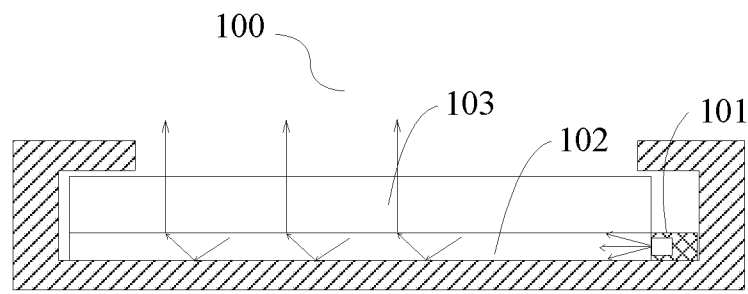
FIG. 1 schematically illustrates an existing optical fingerprint imaging system.
Figure 2:
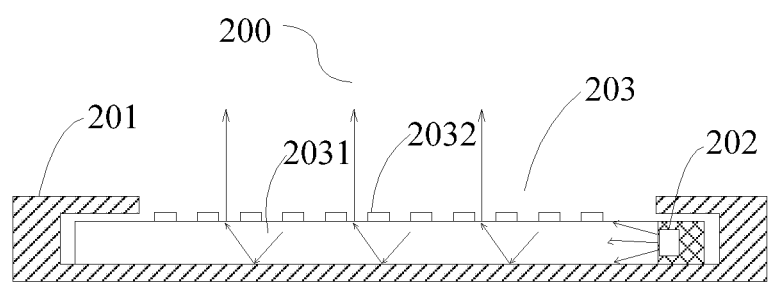
FIG. 2 schematically illustrates a cross sectional view of an optical fingerprint imaging system according to one embodiment of the present disclosure.

Referring to FIG. 2, an optical fingerprint imaging system 200 according to one embodiment of the present disclosure is illustrated. The optical fingerprint imaging system 200 includes: an optical assembly (not labeled in FIG. 2) adapted to implement a fingerprint image capturing process; and a shell 201 for accommodating the optical assembly.

The optical assembly includes: a light source 202 and a sensor 203. Furthermore, the sensor 203 includes a substrate 2031 and a photosensitive layer 2032. The substrate 2031 has a first surface and a second surface, wherein the second surface is located opposite to and lower than the first surface. The photosensitive layer 2032 is disposed on and in contact with the first surface of the substrate 2031. The light source 202 is attached to a lateral side of the substrate 2031 at a position lower than the first surface and higher than the second surface, and light emitted from the light source is adapted to be guided by the substrate to the first surface of the substrate (indicated by arrow lines in FIG. 2). It should be noted that, in the present disclosure, higher and lower are measured with reference to an upmost surface of the optical fingerprint imaging system. When the optical fingerprint imaging system is in use, a finger is placed on the upmost surface. In the optical fingerprint imaging system, a position which is closer to the upmost surface is higher than other a position which is further from the upmost surface.

The photosensitive layer 2032 may be formed on the first surface of the substrate 2031 by a series of processes known in the art, such as film depositing, patterning, and etching.

Furthermore, the substrate 2031 is made of transparent material. In some embodiments, the substrate 2031 is made of glass.

It can be seen that, in the optical fingerprint imaging system 200 provided by the present disclosure, the substrate 2031 of the sensor 203 is employed both for forming the photosensitive layer 2032 thereon and for guiding light emitted from the light source 202 to the first surface of the substrate 2031. Accordingly, function of a light guide plate configured in an exiting fingerprint imaging system is replaced by the substrate 2031 of the sensor 203. Therefore, an additional light guide plate, normally configured in existing fingerprint imaging systems, is not required any more. Therefore, a thickness of the optical fingerprint imaging system is reduced, and a structure thereof is simplified.

Figure 3:
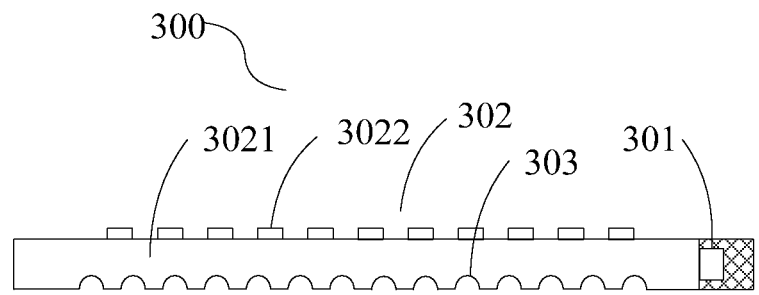
FIG. 3 schematically illustrates a cross sectional view of an optical assembly for an optical fingerprint imaging system according to a first embodiment of the present disclosure.
Figure 4:
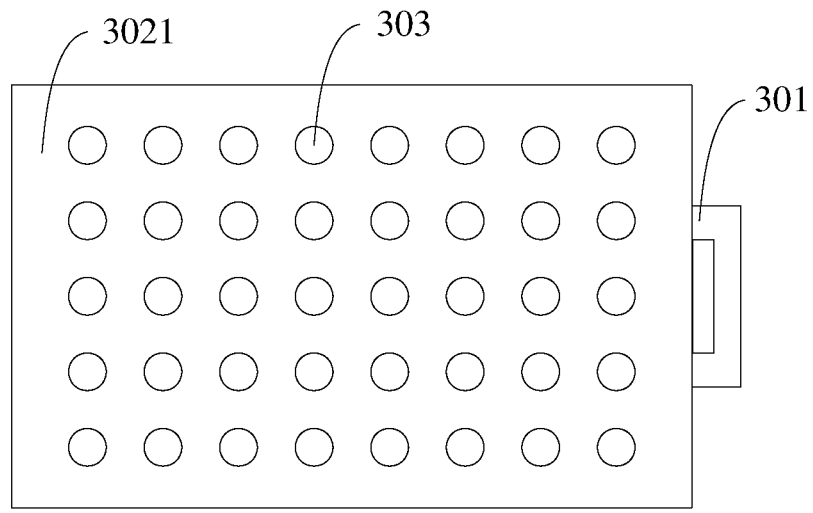
FIG. 4 schematically illustrates a bottom view of the optical assembly according to the first embodiment of the present disclosure.

Referring to FIG. 3 and FIG. 4, an optical assembly 300 for an optical fingerprint imaging system according to a first embodiment of the present disclosure is illustrated. The optical assembly 300 includes a light source 301 and a sensor 302. The sensor 302 includes a substrate 3021 and a photosensitive layer 3022 formed on and in contact with a first surface of the substrate 3021. The light source 301 is attached to a lateral side of the substrate 3021 of the sensor 302, and light emitted from the light source 301 can be guided by the substrate 3021 to the first surface thereof.

The optical assembly 300 further includes a reflecting element 303 formed on a second surface of the substrate 3021, wherein the second surface is located opposite to and lower than the first surface. The reflecting element 303 is employed to reflect light reaching the second surface of the substrate 3021 to the first surface of the substrate. Furthermore, the first surface is an active surface, which means light to the first surface of the substrate 3021 can be employed for capturing a fingerprint image of a finger above the first surface, such as a finger on a cover plate which is disposed above the first surface of the substrate 3021. Accordingly, the configuration of the reflecting element 303 is able to improve use efficiency of the light emitted from the light source 301. Furthermore, a performance of the optical assembly 300 is also improved, as a brightness of the light to the first surface is increased.

As shown, the reflecting element 303 includes a plurality of dots. The plurality of dots can be formed on the second surface of the substrate 3021 by way of printing.

Furthermore, the plurality of dots is adapted to enhance an evenness of the light to the first surface of the substrate 3021, so as to enhance a performance of an optical fingerprint imaging system installed with the optical assembly 300.

In some embodiments, the plurality of dots is formed on the second surface of the substrate 3021 according to a pattern, such as the pattern as shown in FIG. 4. In some embodiments, the plurality of dots is configured on the second surface of the substrate 3021 randomly. It should be noted that, the present disclosure gives no limitation to the configuration and the size of the plurality of dots, as along as it can reflect light reaching the second surface of the substrate 3021 to the first surface. In addition, the reflect pit 303 can be printed on the sensor body by way known to the art, and should not taken as a limitation of the present disclosure.

It should be noted that, the optical assembly 300 can be installed in an optical fingerprint imaging system by being accommodated in a shell (e.g. the shell 201 shown in FIG. 2) thereof. In this case, the plurality of dots can be formed on an inner surface of the shell, wherein the inner surface faces the second surface of substrate 3021.

Figure 5:
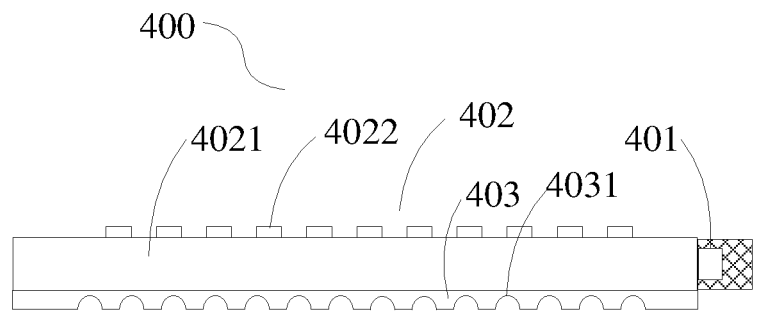
FIG. 5 schematically illustrates a cross sectional view of an optical assembly for an optical fingerprint imaging system according to a second embodiment of the present disclosure.

In some embodiments, the plurality of dots is formed on an additional light guide film. As shown in FIG. 5, an optical assembly 400 according to a second embodiment of the present disclosure is illustrated.

Similarly, the optical assembly 400 includes a light source 401 and a sensor 402. The sensor 402 includes a substrate 4021 and a photosensitive layer 4022 formed on and in contact with a first surface of the substrate 4021. The light source 401 is attached to a lateral side of the substrate 4021 of the sensor 402, and light emitted from the light source 401 can be guided by the substrate 4021 to the first surface thereof.

The optical assembly 400 further includes a light guide film 403 configured with a plurality of dots 4031. The light guide film 403 is disposed facing a second surface of the substrate 4021, wherein the second surface is located opposite to and lower than the first surface of the substrate 4021.

In some embodiment of the present disclosure, the light guide film 403 has a thickness less than 0.2 mm which is smaller than a light guide plate. Therefore, a thickness of the optical assembly 400 is reduced.

In some embodiments of the present disclosure, the light guide film 403 is made of plastic. Accordingly, forming process of the dots 4031 is easier to be implemented.

Figure 6:
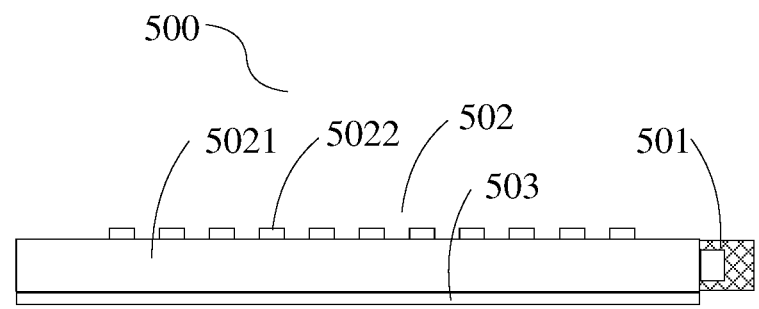
FIG. 6 schematically illustrates a cross sectional view of an optical assembly for an optical fingerprint imaging system according to a third embodiment of the present disclosure.

Referring to FIG. 6, an optical assembly 500 according to a third embodiment of the present disclosure is illustrated.

Similarly, the optical assembly 500 includes a light source 501 and a sensor 502. The sensor 502 includes a substrate 5021 and a photosensitive layer 5022 formed on and in contact with a first surface of the substrate 5021. The light source 501 is attached to a lateral side of the substrate 5021 of the sensor 502, and light emitted from the light source 501 can be guided by the substrate 5021 to the first surface thereof.

The optical assembly 500 further includes a reflecting element. The reflecting element is a reflecting film 503 which is configured having a high glossy. The reflecting film 503 is disposed facing a second surface of the substrate 5021, wherein the second surface is located opposite to and lower than the first surface of the substrate 5021. Thus, light reaching the second surface of the substrate 5021 is reflected by the reflecting film 503 to the first surface of the substrate 5021. Accordingly, use efficiency of the light emitted from the light source 301 is improved. Furthermore, a performance of the optical assembly 500 is also improved, as a brightness of the light to the first surface is increased.

In some embodiments of the present disclosure, the reflecting film 503 is made of organic resin, plastic, or metal.

It should be noted that, the optical assembly 500 can be installed in an optical fingerprint imaging system by being accommodated in a shell (e.g. the shell 201 shown in FIG. 2) thereof. In this case, an inner surface of the shell is processed to have a white or silver color, wherein the inner surface of the shell serves as the reflecting element, and the inner surface of the shell faces the second surface of the substrate 5021.

Figure 7:
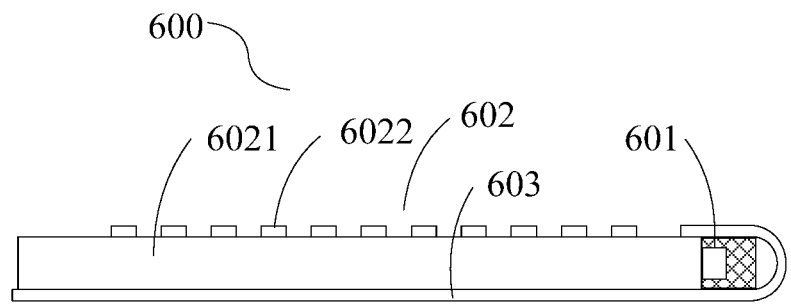
FIG. 7 schematically illustrates a cross sectional view of an optical assembly for an optical fingerprint imaging system according to a fourth embodiment of the present disclosure.

Referring to FIG. 7, an optical assembly 600 according to a fourth embodiment of the present disclosure is illustrated.

Similarly, the optical assembly 600 includes a light source 601 and a sensor 602. The sensor 602 includes a substrate 6021 and a photosensitive layer 6022 formed on and in contact with a first surface of the substrate 6021. The light source 601 is attached to a lateral side of the substrate 6021 of the sensor 602, and light emitted from the light source 601 can be guided by the substrate 6021 to the first surface thereof.

The optical assembly 600 further includes a flexible printed circuit (FPC) 603 which at least covers a second surface of the substrate 6021, wherein the second surface is located opposite to and lower than the first surface of the substrate 6021. A surface of the FPC 603 in contact with the second surface of the substrate 6021 is configured having a high glossy. In other words, the FPC 603 servers as a reflecting element. Thus, light reaching the second surface of the substrate 6021 is reflected to the first surface of the substrate 6021. Accordingly, both use efficiency of the light emitted from the light source 601 and a performance of the optical assembly 600 are improved.

As shown in FIG. 7, one end of the FPC 603 is fixed on the first surface of the substrate 6021 at a position close to the light source 601, and the other end of FPC 603 is folded towards the second surface of the substrate 6021 until a surface of the FPC 603 is in contact with the second surface of the substrate 6021.

Figure 8:
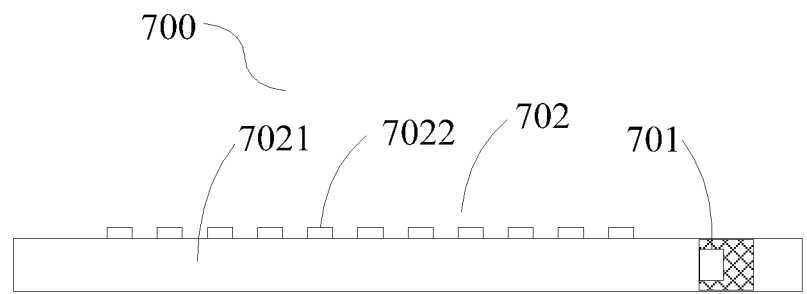
FIG. 8 schematically illustrates a cross sectional view of an optical assembly for an optical fingerprint imaging system according to a fifth embodiment of the present disclosure.
Figure 9:
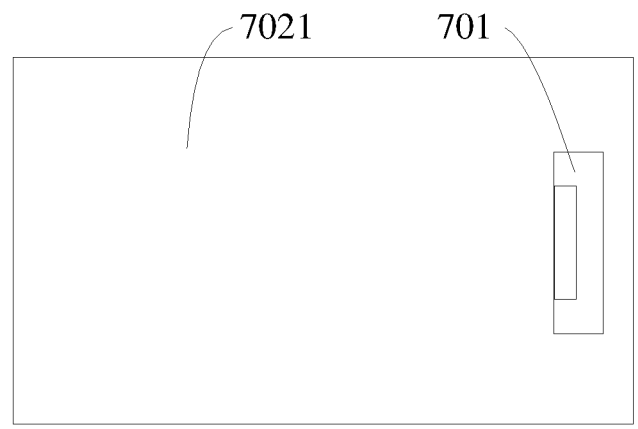
FIG. 9 schematically illustrates a top view of an optical assembly for an optical fingerprint imaging system according to the fifth embodiment of the present disclosure.

Referring to FIG. 8 and FIG. 9, an optical assembly 700 according to a fifth embodiment of the present disclosure is illustrated. The optical assembly 700 includes a light source 701 and a sensor 702.

Similarly, the optical assembly 700 includes a light source 701 and a sensor 702. The sensor 702 includes a substrate

7021 and a photosensitive layer 7022 formed on and in contact with a first surface of the substrate 7021.

As shown, the light source 701 is disposed in an end portion of the substrate rather than being attached to a lateral side of the substrate. Specifically, the end portion of the substrate is configured with a chamber, and the light source 701 is adapted to be tightly accommodated in the chamber. As such, the stability of the light source 701 can be improved.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An optical fingerprint imaging system comprising:
   a sensor and a light source;
   wherein the sensor comprises a substrate and a photosensitive layer, the substrate has a first surface and a second surface which is opposite to and lower than the first surface, and the photosensitive layer is in contact with the first surface of the substrate; and
   wherein the light source is disposed at a position lower than the first surface and higher than the second surface, and light emitted from the light source is adapted to be guided by the substrate to the first surface of the substrate.

2. The optical fingerprint imaging system according to claim 1, wherein the light source is attached to a lateral side of the substrate, or disposed in an end portion of the substrate.

3. The optical fingerprint imaging system according to claim 1, further comprising a reflecting element for reflecting light reaching the second surface of the substrate to the first surface of the substrate.

4. The optical fingerprint imaging system according to claim 3, wherein the reflecting element comprises a plurality of dots formed on the second surface of the substrate.

5. The optical fingerprint imaging system according to claim 3, wherein the reflecting element comprises a reflecting film which is disposed facing the second surface of the substrate.

6. The optical fingerprint imaging system according to claim 3, further comprising a shell for accommodating the sensor and the light source, wherein the reflecting element comprises a plurality of dots formed on an inner surface of the shell, and wherein the inner surface of the shell faces the second surface of the substrate.

7. The optical fingerprint imaging system according to claim 3, further comprising a shell for accommodating the sensor and the light source, wherein an inner surface of the shell is processed to have a white or silver color, and wherein the inner surface of the shell serves as the reflecting element.

8. The optical fingerprint imaging system according to claim 3, further comprising a flexible printed circuit which at least covers the second surface of the substrate, wherein the flexible printed circuit serves as the reflecting element.

9. The optical fingerprint imaging system according to claim 3, wherein the reflecting element comprises a plurality of dots formed on a light guide film, and the light guide film is disposed facing the second surface of the substrate.

10. The optical fingerprint imaging system according to claim 9, wherein the light guide film is made of plastic.

11. The optical fingerprint imaging system according to claim 1, wherein the substrate is made of glass.

12. An optical assembly for an optical fingerprint imaging system comprising:
    a sensor and a light source;
    wherein the sensor comprises a substrate and a photosensitive layer, the substrate has a first surface and a second surface which is opposite to and lower than the first surface, and the photosensitive layer is in contact with the first surface of the substrate; and
    wherein the light source is disposed at a position lower than the first surface and higher than the second surface, and light emitted from the light source is adapted to be guided by the substrate to the first surface of the substrate.

13. The optical assembly according to claim 12, wherein the light source is attached to a lateral side of the substrate, or disposed in an end portion of the substrate.

14. The optical assembly according to claim 12, further comprising a reflecting element for reflecting light reaching the second surface of the substrate to the first surface of the substrate.

15. The optical assembly according to claim 14, wherein the reflecting element comprises a plurality of dots formed on the second surface of the substrate.

16. The optical assembly according to claim 14, wherein the reflecting element comprises a reflecting film which is disposed facing the second surface of the substrate.

17. The optical assembly according to claim 14, further comprising a flexible printed circuit which at least covers the second surface of the substrate, wherein the flexible printed circuit serves as the reflecting element.

18. The optical assembly according to claim 14, wherein the reflecting element comprises a plurality of dots formed on a light guide film, and the light guide film is disposed facing the second surface of the substrate.

19. The optical assembly according to claim 18, wherein the light guide film is made of plastic.

20. The optical assembly according to claim 12, wherein the substrate is made of glass.

* * * * *